United States Patent [19]
Anderson

[11] Patent Number: 5,590,159
[45] Date of Patent: Dec. 31, 1996

[54] DIGITAL DATA SEQUENCE PATTERN FILTERING

[75] Inventor: Bradley T. Anderson, Carboro, N.C.

[73] Assignee: Wandel & Goltermann Technologies, Inc., Research Triangle Park, N.C.

[21] Appl. No.: 384,855

[22] Filed: Feb. 7, 1995

[51] Int. Cl.[6] ............................................. H04L 27/06
[52] U.S. Cl. .................... 375/340; 375/343; 375/368; 382/181; 395/2.4; 371/67.1; 364/275.9
[58] Field of Search ........................... 375/354, 365, 375/368, 367, 340, 343; 370/100.1, 101, 102, 105.4, 105.5, 106, 108; 371/47.1, 67.1, 68.1; 360/51, 40; 395/2.4, 2.52, 2.53, 2.6; 364/275.9; 382/181, 165, 170

[56] References Cited

U.S. PATENT DOCUMENTS

| | | |
|---|---|---|
| 3,399,351 | 8/1968 | Reszka . |
| 3,439,335 | 4/1969 | Slayton . |
| 3,760,355 | 9/1973 | Bruckert ............................ 375/365 |
| 4,065,639 | 12/1977 | Suzuki et al. . |
| 4,298,987 | 11/1981 | Stattel et al. . |
| 4,575,864 | 3/1986 | Rice, Jr. et al. .................. 376/366 |
| 4,727,558 | 2/1988 | Hall . |
| 4,730,346 | 3/1988 | Jiang . |
| 4,734,676 | 3/1988 | Huon et al. . |
| 4,754,420 | 6/1988 | Jensen . |
| 4,792,753 | 12/1988 | Iwai . |
| 4,956,854 | 9/1990 | Bengtson . |
| 4,979,185 | 12/1990 | Bryans et al. . |
| 5,005,191 | 4/1991 | O'Connor et al. . |
| 5,025,458 | 6/1991 | Casper et al. . |
| 5,058,141 | 10/1991 | Kem et al. . |
| 5,113,417 | 5/1992 | McNesby . |
| 5,204,883 | 4/1993 | Blanc ............................... 375/365 |
| 5,239,497 | 8/1993 | McKay et al. . |
| 5,297,185 | 3/1994 | Best et al. ........................ 375/365 |
| 5,333,150 | 7/1994 | Ketterling ........................ 375/329 |

*Primary Examiner*—Tesfaldet Bocure
*Assistant Examiner*—Bryan Webster
*Attorney, Agent, or Firm*—William G. Dossé; Moore & Van Allen, PLLC

[57] ABSTRACT

To recognize a specific pattern of bits anywhere within a high-speed bit stream of data, the serially-received bytes of the bit stream are first converted to parallel or simultaneously-presented, eight-bit bytes. Received bytes are used as the addresses of two SRAMs. A byte of the desired pattern is recognized by having that byte address a memory location of one of the SRAMs in which a binary "1" has been stored at the bit location within that memory location that corresponds to the received byte's position within the expected bit pattern. The other seven bit locations within that memory byte have binary "0s" stored in them. The outputs from the two SRAMs are gated to look for a sequence of two successive bytes of the expected pattern. A binary "1," signifying recognition of receipt of two successive bytes, is clocked into one of a plurality of shift registers. The length of each shift register represents the opposite of the position, within the expected sequence pattern, of the two successive bytes. The outputs of the shift registers are all connected to inputs of an AND-gate, the output of which indicates a match with the respected sequence pattern. As each successive pair of received bytes is clocked into the address registers of the SRAMs, the shift registers are clocked to advance their stored bits by one stage.

11 Claims, 3 Drawing Sheets

DIGITAL DATA SEQUENCE PATTERN FILTERING

TECHNICAL FIELD

The present invention relates to binary digital data sequence pattern recognition and more particularly to correlating a received pattern of combinations of binary bits with an expected pattern of combinations of bits.

BACKGROUND ART

Pattern recognition of the bits in a binary bitstream is almost as old as the perking of the attention of a 19th century telegrapher as he hears the call letters of his station. Before the electronic era, mechanical sequence detectors would recognize a binary bit sequence, code combination or character and would prime the detector to recognize the next character in the sequence. When the last character in the expected sequence was thus primed and recognized, an electrical contact was closed or a mechanical lever was actuated.

With the arrival of semiconductors and integrated circuits, shift registers were used to convert the serially-arriving bits into simultaneous or parallel presentations of each binary code combination or character (now often called a "byte" if consisting of eight bits). AND-gates, NOR-gates, registers, etc., were then used to recognize the characters and note the order of their arrival, issuing some kind of trigger when the expected sequence of characters had been recognized.

With modern, high-speed data communications and electronic digital computer switching of such data traffic, the expected sequences to be recognized get longer, must be changeable under software control rather than by hard wiring, and the recognition circuits must react more quickly.

U.S. Pat. No. 4,298,987 granted, on Nov. 3, 1981, to Stattel, et al. teaches using the received code combination as the address for a random access memory (RAM) integrated circuit, the code combination that addresses the appropriate address location within the RAM causes a recognition signal to be issued at the input/output port of the RAM. RAMs are quick-acting electronic devices and their contents can be changed under software control. However, as taught by Stattel, et al., they can get very large and complicated when the sequences get long.

DESCRIPTION OF INVENTION

Therefore, it is an object of the present invention to provide for the high-speed recognition of a sequence of binary information which is readily changeable, which can find that sequence wherever it appears in the byte stream and which is readily amenable to long sequences.

In accordance with the present invention, a binary digital data sequence pattern recognition and filtering circuit correlates and matches a received patter of combinations of binary bits with an expected pattern of combinations of binary bits by using each combination of binary bits as the address of a digital memory device. Each memory address location, the address of which corresponds to one of the combinations of the expected pattern of combinations of binary bits, has a binary "1" stored in one of its bit positions. The bit position at which the binary "1" is stored corresponds to the position of the combination of binary bits within the expected pattern of combinations of binary bits. A binary "1" is then delayed by a selective number of memory cycles corresponding to the reverse order of the address combination's position within the expected pattern of bit combinations. The binary "1s," as selectively delayed, are sampled to ascertain whether or not they are all present at the same time, so as to indicate if the expected combinations arrive in the expected sequence or order.

BRIEF DESCRIPTION OF THE DRAWINGS

The present invention will be more fully understood by reference to the following detailed description when considered in conjunction with the following drawing wherein.

BEST MODE FOR CARRYING OUT THE INVENTION AND ITS INDUSTRIAL APPLICABILITY

Figure 1A:
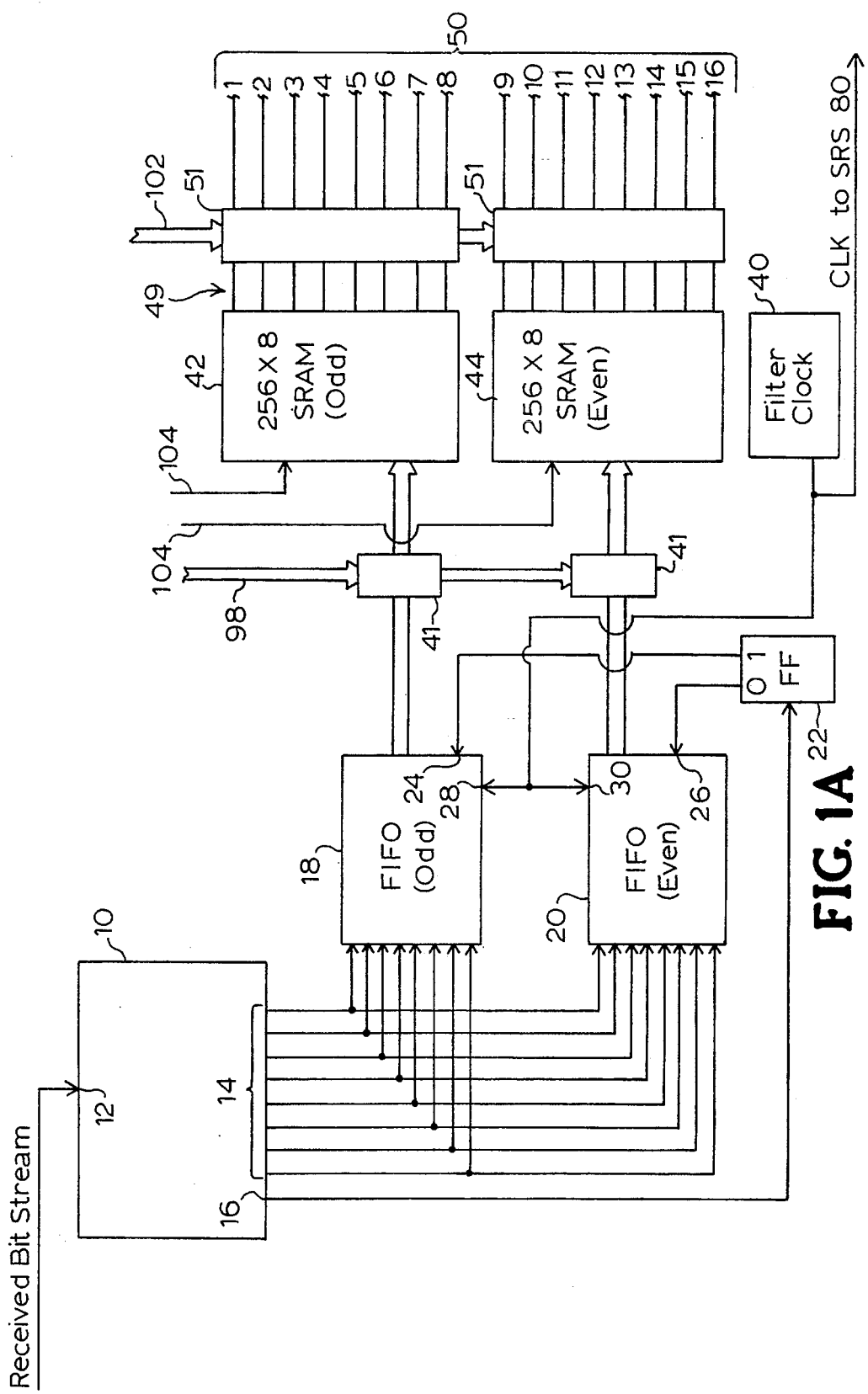
FIG. 1A shows, in schematic form, the first part of a preferred embodiment of the present invention, including recognizing received data bytes.

Referring now to the accompanying drawing and more particularly to FIG. 1A, a received bit stream is schematically shown entering the input of a deserializing and framing circuit 10. The circuit 10 is entirely conventional and converts a serial stream of bits, at a serial input 12, into "parallel" groups of bits (e.g., into eight-bit bytes) that are simultaneously presented at a data output 14 to a receiver of some kind. The circuit 10 also frames these bytes so that each byte can represent a discrete portion of a transmitted message, such as an ASCII representation of an alphanumeric character. When an eight-bit byte has been received, is available at the data output 14, and is ready to be read into the next device in the system, the circuit 10 emits a byte-available signal at a byte trigger output 16.

The eight parallel data outputs of the circuit 10 are delivered to the eight inputs of two eight-bit, first-in-first-out (FIFO) circuits 18 and 20. Both of the FIFO circuits 18 and 20 are thus arranged to receive the same parallel or simultaneous input signals from the circuit 10. However, the FIFO circuits 18 and 20 are to receive and store alternate bytes received from the circuit 10. To distinguish this, the FIFO 18 is arbitrarily designated as receiving and storing the odd-numbered bytes while the FIFO circuit 20 is designated as receiving the even numbered bytes. Each FIFO 18 and 20 includes or has an associated output register (not separately shown) into which each output byte is in turn stored in order to maximize the duration that the output byte will be available to subsequent circuitry.

In order to control the storing of bytes in alternate FIFO circuits, the trigger output 16 is not delivered to the "store" or clock-in input of each FIFO circuits but rather to a bistable multivibrator or flip-flop circuit 22, The "normal" or "1" output of the flip-flop 22 is connected to the clock-in terminal 24 of the FIFO 18, and the "inverted" or "0" output of the flip-flop 22 is connected to the clock-in terminal 26 of the FIFO 20. Since the FIFO circuits are built to store an input data signal present at their input data terminals when their clock input terminals experience a transition from a low voltage to a high voltage, the flip-flop 22 triggers the two FIFO circuits to store their input data alternately upon alternate byte-available signals from the circuit 10.

The usual purpose of the FIFO circuits is to accommodate substantial differences between the rate that data bytes are available from a data source such as the circuit 10 and the rate that data bytes are later utilized. A representative type of FIFO circuit is available as an integrated circuit from Cypress Semiconductor Corporation, of San Jose, Calif. under the designation CY7C460, CY7C462, or CY7C464.

In order to accomplish the objectives of the present invention, the data bytes from the circuit 10 could merely be gated for utilization. However, for reasons not relevant to the present invention, the data bytes from the circuit 10 are preferably first stored into the FIFO circuits so that they are also available to functions of the network analyzer other than the present filter circuit. The FIFO circuits are made in such a way that the oldest byte not yet clocked out of the FIFO circuit is automatically present at the output of the FIFO. In order better to utilize the byte at the output of a FIFO circuit, the output of each FIFO circuit includes an output storage register (not separately shown). When a new sixteen-bit binary word is required from the FIFOs, a filter clock 40 furnishes clock signals to the two FIFO circuits' output clock inputs 28 and 30, respectively. Each clock signal from the filter clock 40 clocks the oldest byte in each FIFO into its associated output storage register. At the same time, the FIFO deletes that oldest byte and moves the next oldest byte to the inputs of its output storage register to await the next cycle of the filter clock 40.

The filter clock 40 also times the operations following the FIFO circuits and may actually be the clock that times most of the internal functions of the network analyzer of which the present filter circuit is a part. By alternately storing bytes in two FIFO circuits for accessing in sixteen-bit combinations or binary words of two bytes each, a sixteen-bit data bus is created within the protocol analyzer of which the present filter circuit is preferably a part. Therefore, the filter clock 40 actually times all functions on the sixteen-bit bus and preferably runs at no less than at one-half the speed of the byte-trigger rate of the circuit 10.

Each code combination or sixteen-bit binary word that is used for filtering to find the expected sequence pattern has a number of bits (sixteen) that is a multiple (by two) of the number of bits (eight) in the groups or bytes simultaneously presented by the circuit 10. That multiple could just as easily be four in order to form thirty-two-bit code combinations or binary words. Conversely, the multiple could be one, in which the number of bits (eight) in each code combination or binary word used for the filtering operation would be one eight-bit byte. It will also be evident that binary words that have numbers of bits that are not even or integer multiples of eight are also possible, but would be less attractive from both a practical and economic standpoint.

Figure 1B:
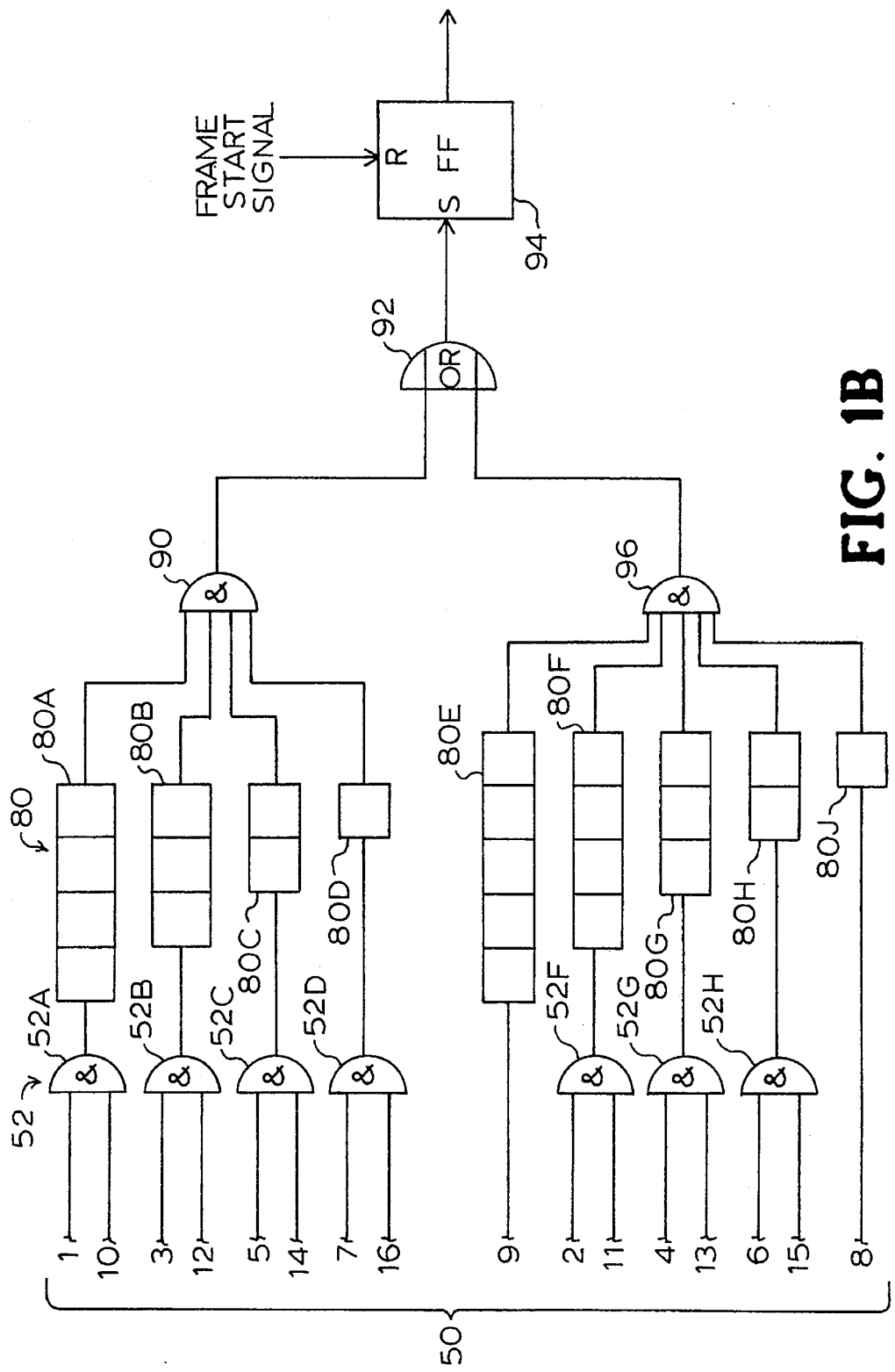
FIG. 1B shows, in schematic form, the second part of a preferred embodiment of the present invention, including recognizing sequences of received data bytes.

By running at or slightly faster than the byte-trigger rate of the circuit 10, overflowing the FIFO circuits 18 and 20 is avoided. However, it will hereinafter be evident that the application of the output of the filter clock 40 to the present filter circuit of FIGS. 1A and 1B should be inhibited whenever the FIFO circuits are empty, in order to avoid responding to spurious blank data signals.

The eight data outputs of the odd FIFO 18 are delivered through eight buffer gates 41 to the address inputs of a static random access memory (static RAM or SRAM) 42 which has 256 address locations, the most that can be conveniently addressed by eight binary bits. The purpose and function of the buffer gates will be described in greater detail below in connection with storing or writing data into the address memory locations of the SRAM 42.

Each address location of the SRAM 42 can store eight binary bits. Because the address inputs of the SRAM 42 are derived from the data outputs of the odd FIFO 18, the SRAM 42 is arbitrarily designated the odd SRAM. Similarly, the eight data outputs of the even FIFO 20 are delivered, also through a buffer gate 41, to the address inputs of an even SRAM 44 (see FIG. 3).

The output of the filter clock 40 is connected to the output clock inputs 28 and 30 of the FIFO circuits 18 and 20. Therefore, data bytes are available at the outputs of the FIFO circuits shortly after the transition to a low voltage at the output of the filter clock 40.

While two eight-bit SRAMs are preferred for filtering a sequence pattern composed of sixteen-bit code combinations or binary words, it will be evident to one of ordinary skill in the art that a sixteen-bit SRAM can also be used. However, a sixteen-bit SRAM can address sixty-four thousand address locations, and that is not necessary. Five-hundred-twelve address locations are adequate.

Also, it will also be evident that filtering in sixteen-bit code combinations is an arbitrary choice; and code combinations or bytes of eight bits each as the filtering unit, using only a single SRAM, is actually logically easier. However, with high transmission speeds, a sixteen-bit data bus is preferred for the rest of the network analyzer and actually permits the use of slower-responding, less-expensive SRAM integrated circuits (ICs). If eight-bit filtering were used, each byte would be filtered separately, and the FIFO circuits would not be needed. The data outputs of the circuit 10 could be delivered directly to the address inputs of the single SRAM that would be needed.

A static RAM is preferred because it is simple to use and does not require that any refresh circuitry be provided, and the data capacity of currently-available dynamic RAMs is not usually necessary in a sequence recognition circuit. A read-only memory (ROM) could be used in place of the SRAM, but it should be programmable (PROM) so that it can be programmed very easily in the field. The PROM should also be erasable (EPROM) to allow reprogramming of the sequence pattern that is to be recognized. Also, for convenience, the EPROM should be electrically erasable (EEPROM) in order to obviate the manual manipulation of an ultraviolet source to erase the contents of the ROM.

Every time that a byte is received from the conventional serial-to-parallel converter and byte-framing circuit 10, the FIFOs pair it with an adjacent byte and present the resulting two-byte binary word to the address inputs of the two SRAMs 42 and 44. When the output data from the FIFOs have subsequently settled into the address inputs of the two SRAMs 42 and 44, the SRAMs make the contents of the thus-addressed memory location available at their input/output terminals 49.

If that received, address byte at the address input of either SRAM corresponds to one of the eight bytes of an expected sixty-four-bit sequence pattern, that received byte is recognized by having it address a memory location of the SRAM 42 or 44 in which a binary "1" has been stored. The other seven bits stored at that address location are binary "0s". The position of the binary "1" within the eight bits stored at that address location corresponds to the position of the address byte within the eight bytes that make up the expected sequence pattern of sixty-four bits. That is, if the byte that addresses the SRAM is the first byte of the expected sequence pattern, the binary "1" is stored in the first bit position at that addressed memory location.

If that received, address byte appears twice in the expected sequence pattern, there would be two binary "1s" stored at that address location in the SRAM 42 or 44. Also, since a byte of the expected sequence pattern can be received in either the odd or the even time position within the sixteen-bit binary word (see FIG. 3), the coding stored in the memory address locations of one SRAM is identical to that stored in the other SRAM.

It will be evident to one of ordinary skill in the digital electronics art that the term "binary '1'" is arbitrary. What one person calls a binary "1," the next person can just as easily call a binary "0." In the context of the present description and accompanying claims, the binary sense of the codes can readily be reversed and "negative logic" can be used such that AND-gates can be replaced with NOR-gates. Memory locations of the SRAM 42 or 44, the addresses of which do NOT correspond to a byte of the expected bit sequence pattern, have binary "0s" stored in all eight of their bit positions. As soon as the address is present in the SRAM's address register (not separately shown), the eight bits stored at the addressed memory location are present at the SRAM's input/output register (not separately shown) and at the output terminals 49 of the SRAM 42 or 44.

The object is to recognize a specific sequence pattern of up to sixty-four bits—a sequence that is eight bytes long or four sixteen-bit binary words long. That is, the object is to recognize the expected bytes to be received in the proper sequence anywhere within the stream of bytes being received by the deserializing and byte-framing circuit 10. Therefore, the data outputs at the input/output terminals 49 of the SRAMs 42 and 44 are presented, through bidirectional buffers 51, as the inputs 50 of a plurality of AND-gates 52. If the bidirectional buffers 51 are properly gated for searching or filtering to find an expected sequence pattern, the output terminals 49 of the SRAMs are connected to and functionally indistinguishable from the inputs 50 of the AND-gates 52. Therefore, the output terminals 49 of the SRAMs will also be referred to as the outputs 50 of the SRAMs. The numbers shown at the individual data outputs 50 correspond to the numbers shown at the individual inputs 50 of the AND-gates 52. The use of the numbers at the individual data outputs 50 and the individual inputs 50 is to illustrate preferred interconnections between the outputs of the SRAMs 42 and 44 and the inputs of the AND-gates 52.

The bidirectional buffers 51 gate or selectively connect the data input/output terminals 49 of the SRAMs to the inputs of the AND-gates 52. The bidirectional buffers 51 are intended to facilitate the reprogramming of the SRAMs. Their operation and purpose will be described below in connection with the discussion of reprogramming of the SRAMs.

Like numbers of the individual outputs 50 and the individual inputs 50 represent direct, wired interconnections, which are shown as number references for clarity rather than as a mass of confusing, crossing interconnections. Therefore, the individual output 50 of the SRAM 42 that bears the number "2" is the output from the second bit position within the memory locations of the SRAM 42. That number "2" output is directly connected to the upper input 50 of the AND-gate 52F. The output 50 of the SRAM 44 that bears the number "11" is the output from the third bit position within the memory locations of the SRAM 44 and is connected to the lower input 50 of the AND-gate 52F. If the odd SRAM 42 is addressed by the second byte of the expected sequence pattern and the even SRAM 44 is addressed by the third byte of the expected sequence pattern, a correct portion of the desired sequence has been recognized; and a binary "1" appears at the output of the AND-gate 52F to so indicate.

Figure 2:
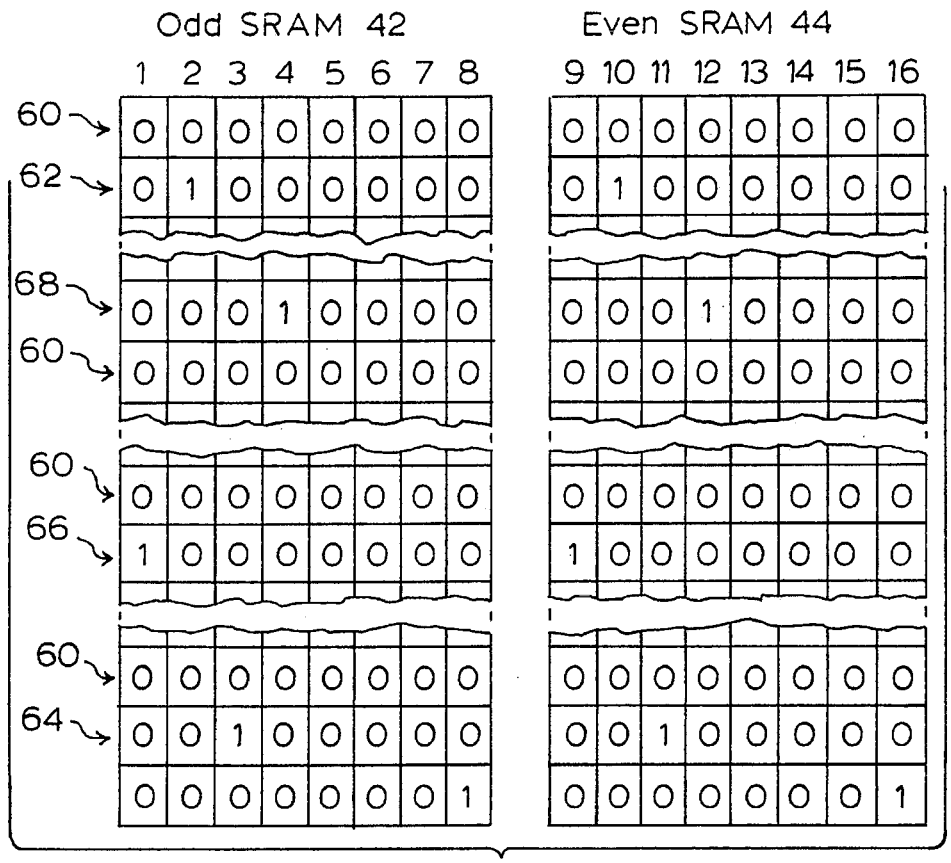
FIG. 2 is an exemplary, partial table of values stored in the memory locations of the static random access memories of FIG. 1.

The purpose of the AND-gates 52 will be more readily appreciated by reference to the exemplary coding chart of FIG. 2 which shows how the memory locations of the odd SRAM 42 and the even SRAM 44 might be coded. The coding of the odd SRAM 42 is shown on the left and the coding of the even SRAM 44 is shown on the right. The numbers at the heads of the sixteen columns correspond to the numbers that have been given to the individual bit-position outputs/inputs 50 of FIGS. 1A and 1B.

The two SRAMs should be coded identically, as shown by two identical sets of columns in FIG. 2; because, it should not matter whether an expected byte of the sequence pattern is an odd-numbered byte or an even-numbered byte. It should be properly recognized, and the significance of whether it is an odd-numbered or an even-numbered byte is sorted out by the connections between the outputs 50 of the SRAMs and the inputs 50 of the AND-gates 52. However, it is important that the preceding byte and succeeding byte should also be properly recognized by the SRAMs and the AND-gates. All of which is made more evident by the consideration of FIG. 2 in conjunction with FIGS. 1A and 1B.

If the received byte addresses any of the locations 60, all of the outputs of that SRAM will carry binary "0s," indicating that the address byte of that SRAM was not one of the bytes of the expected sequence pattern. However, if one of the bytes of the expected sequence pattern is received, it addresses a memory location within a SRAM in which at least one binary "1" has been stored.

Consider the operation of the AND-gate 52F, the inputs of which are derived from the second bit position of the outputs 50 of the SRAM 42 and the third bit position of the outputs 50 of the SRAM 44. In FIG. 2, the odd-numbered, received byte addresses the memory location 62 (FIG.2) of the odd SRAM 42. A binary "1" has been programmed in the second bit position at that memory location. That binary "1" is thus present at the upper input 50 of the AND-gate 52F. If at the same time, the next, even-numbered, received byte addresses the memory location 64 (FIG. 2) of the even SRAM 44, where a binary "1" has been stored in the third bit position, that binary "1" is present on the output 50 that is numbered "11" and is supplied to the lower input of the AND-gate 52F. Since the AND-gate 52F has a binary "1" at both of its inputs, the AND-gate 52F issues a binary "1" at its output. A binary "1" at the output of the AND-gate 52F signifies that the second and third bytes of the expected sequence pattern have been successively received, the second byte in the odd position and the third byte in the even position in the sixteen-bit binary word.

Figure 3:
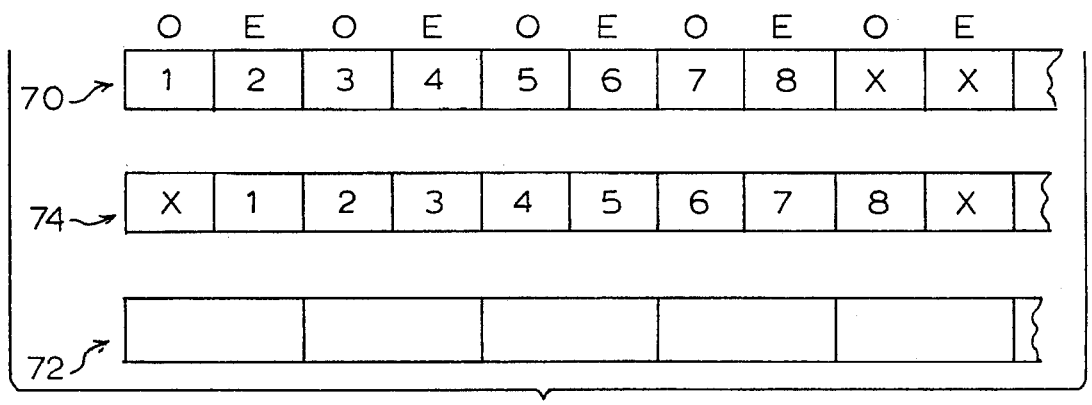
FIG. 3 show two examples of how an eight-byte sequence might be recognized by the circuit of FIG. 1

The odd-even alternative sequencing of the expected pattern can be more readily understood by referring to FIG. 3, which shows graphically the eight bytes of the expected sequence pattern, represented by the numbers "1" through "8" in two timing bars. The letter "X" represents bytes not part of the expected sequence pattern. In the first representation shown in timing bar 70, the first byte of the sequence pattern is denoted as an odd-numbered byte and would address the odd SRAM 42. The second byte of the expected sequence is denoted as an even-numbered byte and would address the even SRAM 44. Binary words are represented by the timing bar 72.

If the first byte of the expected sequence pattern happens to be timed as an even-numbered byte, that first byte and the rest of the expected sequence is shown in the representation of timing bar 74. This is the representation illustrated above with respect to FIG. 2 in which the second byte of the expected sequence pattern was an odd-numbered byte. That second byte addressed the SRAM 42 and produced the output illustrated as memory location 62 in FIG. 2 The third byte of the expected sequence pattern was an even-numbered byte and is represented as memory location 64 in FIG. 2.

In view of the fact that receipt of the expected sequence pattern can start with either an even-numbered byte or an odd-numbered byte as shown in FIG. 3, the purpose of the AND-gates 52 will now be described. If, as set forth above, the first byte of the expected sequence pattern is odd-numbered, it causes the odd SRAM 42 to deliver a binary "1" at the upper input of the AND-gate 52A (see also location 66 in FIG. 2). Simultaneously, the receipt of the second byte of the expected sequence pattern, as the even-numbered byte of the binary word, that second byte causes the even SRAM 44 to deliver a binary "1" to the lower input of the AND-gate 52A (see also location 62 in FIG. 2).

The next output of the filter clock 40 causes that binary "1" to be set into the first stage of a four-stage compensating shift register 80A of a group of compensating shift registers 80. The shift registers 80 are intended to compensate for the fact that the recognition of the first byte of the expected sequence pattern is received several byte-times sooner than the last byte of the expected sequence pattern.

If the next two bytes received are the third and fourth bytes, respectively, of the expected sequence pattern, the third byte addresses a memory location in the SRAM 42 that causes a binary "1" to appear at the third bit position at the output 50 of the SRAM 42—see memory location 64 in FIG. 2. That binary "1" is delivered to the upper input 50 of the AND-gate 52B. The fourth byte of the expected sequence pattern causes the SRAM 44 to deliver a binary "1"—see memory location 68 in FIG. 2—to the lower input 50 of the AND-gate 52B. Therefore, the output of the AND-gate 52B delivers a binary "1" to be clocked into the first stage of a three-stage compensating shift register 80B on the next output of the filter clock 40. That same output of the filter clock 40 shifts the binary "1" from the first stage of the shift register 80A to its second stage.

If the fifth and sixth bytes of the expected sequence pattern are then received and address the SRAMs 42 and 44, the resulting binary "1s" applied to the two inputs 50 of the AND-gate 52C cause the AND-gate 52C to deliver a binary "1" to the first stage of a two-stage shift register 80C. The next output from the filter clock 40 clocks that binary "1" into the first stage of the too-stage shift register 80C and also advances the binary "1" from the first stage to the second stage of the shift register 80B and also advances the binary "1" from the second stage to the third stage of the shift register 80A.

Receipt of the seventh and eighth bytes of the expected sequence pattern similarly cause the AND-gate 52D to present a binary "1" to a single-stage shift register 80D. The next output from the filter clock 40 clauses that binary "1" to be clocked into the one and final stage of the shift register 80D. That same output from the filter clock 40 advances the binary "1s" into the final stage of each of the shift registers 80A, 80B, and 80C. The outputs from all four of the shift registers 80A, 80B, 80C, and 80D provide the four inputs to a recognition AND-gate 90. Since all four of the inputs of the recognition AND-gate 90 are in the binary "1" state, the output of the AND-gate 90 also is in the binary "1" state.

Only three stages are necessary in the shift register 80A, and the output of the AND-gate 52D could be delivered directly to the recognition AND gate 90. However, the reason for the final stage of the shift registers 80A, 80B, 80C, and 80D is to avoid errors due to timing problems. With those final stages, all four inputs to the recognition AND-gate 90 are clocked together rather than the output from the AND-gate 52D reaching the recognition AND-gate 90 whenever it happens to come along.

A binary "1" at the output of the recognition AND-gate 90 passes through an OR-gate 92 and sets a flip-flop 94 to its binary "1" state. The flip-flop 94 remains in its binary "1" state until a reset signal is present at the reset input of the flip-flop 94 at the beginning of receipt of the next data frame, cell, or packet. Until that reset occurs, the output of the flip-flop 94 can be used during the remainder of the receipt of the data frame, cell, or packet in which the expected sequence pattern was recognized.

Referring now to the timing bar 74 of FIG. 3, the first byte of the expected sequence pattern is timed to be an even-numbered byte since it is the second byte of a sixteen-bit binary word received by the filter circuit. Therefore, that first byte of the expected sequence is stored by the even FIFO 20 and addresses the even SRAM 44. The memory location addressed by that first byte is the location represented by 66 in FIG. 2, with a binary "1" stored in the first bit position of the even SRAM 44. That binary "1" is carried on the output numbered 9 of the outputs/inputs 50 and is connected directly to the input of a five-stage shift register 80E. The first output of the filter clock 40 clocks that binary "1" into the first stage of the shift register 80E.

If the next two bytes are the second and third bytes, respectively, of the expected sequence pattern, they address the odd SRAM 42 and even the SRAM 44, respectively. The resulting binary "1" outputs from the two SRAMs provide binary "1s" at both inputs of the AND-gate 52F, which then makes a binary "1" available at the input of a four-stage shift register 80F. The next succeeding output of the filter clock 40 clocks that binary "1" into the first stage of the shift register 80F and also advances the binary "1" from the first stage to the second stage of the shift register 80E.

If the next two bytes received are the fourth and fifth bytes of the expected sequence pattern, the AND gate 52G issues a binary "1" to the input of a three-stage shift register 80G. The next output of the filter clock 40 clocks the binary "1" into the first stage of the shift register 80G and advances the binary "1" by one stage in the shift registers 80E and 80F.

The sixth and seventh bytes similarly cause a binary "1" to be introduced into the two-stage shift register 80H. The eighth byte of the expected sequence pattern then appears as the address of the odd SRAM 42. The address at the even SRAM 44 does not then matter; because, receipt and recognition is complete with the eighth byte. The binary "1" in the eighth bit position of the output of the odd SRAM 42 goes directly to the input of a one-stage shift register 80J. As in the case described above with respect to the recognition AND-gate 90, the next output from the filter clock 40 clocks all of the binary "1s" into the final stages of all of the shift registers 80E, 80F, 80G, 80H, and 80J. The binary "1s" at the outputs of all of those shift registers cause a recognition AND-gate 96 to issue a binary "1" through the OR-gate 92 to set the flip-flop 94 to its binary "1" state.

Consequently, the recognition AND-gate 90 (and those of the AND-gates 52 and shift registers 80 that feed the recognition AND-DUR gate 90) serves to recognize the expected sequence pattern when it is timed as shown in representation of timing bar 70 of FIG. 3. The recognition AND-gate 96 (and those of the AND-gates 52 and the shift registers 80 that feed the recognition AND-gate 96) serves to recognize the expected sequence pattern when it is timed as shown in representation of timing bar 74 of FIG. 3.

If an eight-bit bus is used rather than a sixteen-bit bus, there may be no need for the FIFO circuits 18 and 20. The data outputs from the circuit 10 can be delivered directly to the address inputs of only a single SRAM. Each received byte is thus decoded separately by the SRAM. There is no need for the AND-gates 52. Only a single set of shift registers 80 is then needed. However, the number of stages will vary from eight to one. A single eight-input recognition AND-gate 90 and no OR-gate 92 will be used.

If at any time a byte is received which is not the appropriate byte of the expected sequence pattern, that is expected to be received at that time, a binary "0" is produced at the bit position where a binary "1" should be produced at the output of the SRAM. Therefore, the appropriate AND-gate 52 has a binary "0" at one of its inputs and produces a binary "0" at the input of its associated shift register 80. Consequently, the recognition AND-gate 90 or 96 has a binary "0" at one of its inputs at the critical time; and the flip-flop 94 is not set to its binary "1" state.

The SRAMs 42 and 44 are programmable. Therefore, the contents of the memory locations illustrated in FIG. 2 can be reprogrammed at any time by an associated computer (not shown), in order to change the sequence pattern to be recognized or filtered. The associated computer delivers SRAM addresses on a plurality of address conductors 98 (FIG. 1A), through the buffer gates 41, and to the address inputs of the SRAMs 42 and 44. The buffer gates 41 allow either the FIFOs or the associated computer to address the SRAMs without interference from the other.

The buffer gates 41 are sometimes called "tri-state buffers" because its output can be at one of three states. When the voltage input to its gate terminal is logically high, the buffer gate's output terminal is floating just like an open switch.

When the voltage input to its gate terminal is a logical low, the voltage of the buffer gate's output terminal is either high or low depending upon the voltage at the buffer gate's input terminal.

Therefore, if the buffer gates having their input terminals connecting the outputs of the FIFO are closed, like a closed switch, the outputs of the FIFOs are connected to the address inputs of the SRAMs. However, if the buffer gates having their input terminals connected to the address conductors from the associated computer are closed, the associated computer can address the memory locations of the SRAMs in order to reprogram them. When the buffer gates from the FIFOs are closed, the buffer gates from the associated computer are open, and vice versa.

For each address sent by the associated computer to the SRAMs, eight memory data bits are delivered from the associated computer on a plurality of data conductors 102. These memory bits are sent through bidirectional buffers 51 to the SRAM input/output terminals 49, which also deliver the SRAMs' outputs 50. The bidirectional buffers 51 isolate the data output terminals 49 of the SRAMS from the input terminals 50 of the AND-gates 52.

The bidirectional buffers 51 are also known as High-Speed, C-MOS, Eight-bit, Transceivers and are available from various manufacturer under the designation 74X245, where the X stands for any of several letter codes which designate particular parameters, eg., 75FCT245. One specific source for such integrated-circuit devices is understood to be Quality Semiconductors of Santa Clara, Calif., U.S.A.

Since any given byte of the expected sequence pattern could be received in either the even or the odd position within the sixteen-bit binary word that addresses the two SRAMs (see FIG. 3), the two SRAMs are programmed identically. Therefore, the same address and the same input data are delivered to both of the SRAMs 42 and 44 at the same time. The associated computer preferably sends a write command to the two SRAMs on the two write command conductors 104. Alternatively, there could only be a single write command conductor 104 going to both SRAMs. A sequence pattern filtering circuit is useful in digital data transmission for recognizing a particular, specific sequence of binary bits which might designate a routing address or other information often contained in the header of a data transmission frame, cell, or packet. Such information, when filtered out of a bit stream, can caused the switching or routing of the entire packet. In the analyzing of digital communication protocols and many other aspects of analyzing digital transmissions, rapid, accurate, flexible, and inexpensive recognition of sequences of bits or eight-bit bytes or sequences of bytes can be crucial to the successful design, manufacture, exploitation, and marketing of protocol and other analyzers.

The conception and the specific embodiments disclosed above may be readily utilized as a basis for modifying or designing other structures for carrying out the purposes of the present invention. Such equivalent constructions do not depart from the spirit and scope of the invention, as set forth in the appended claims.

I claim:

1. A binary digital data sequence pattern recognition and filtering circuit for correlating a received pattern of combinations of binary bits with an expected sequence pattern of bit combinations and detecting when the received pattern of bit combinations matches the expected pattern of bit combinations, comprising:

at least one digital memory device having address inputs and data outputs, said address inputs being equal in number to the number of bits in said bit combination and said address inputs being connected so as to receive successive applications of the received bit combinations;

the contents of each memory location within the digital memory device appearing at the data outputs in response to the address of that memory location appearing at the address inputs;

each address location of the digital memory device having a capacity of binary bits at least equal to the number of bit combinations contained in the expected pattern of bit combinations;

a binary "1" stored in one of the bit position at each address location, of the digital memory device, the address of which corresponds to one of the bit combinations of the expected pattern of bit combinations, the bit position at which the binary "1" is stored within that address location corresponding to the position of the address bit combination within the expected pattern of bit combinations;

means for storing and delaying at least one binary "1" bit by at least a number of memory device cycles inversely equal to the positions of the associated address bit combination within the expected sequence pattern; and means for sampling the output of the memory device, as delayed, and indicating reception of the expected pattern of bit combination when all binary "1" are noted.

2. A binary digital data sequence pattern recognition and filtering circuit according to claim 1 wherein said binary bits are received in a serial stream and further comprising a deserializing and framing circuit for converting the bitstream into a series of discrete groups of binary bits, each group having the same number of bits, with the bits of the group being presented simultaneously.

3. A binary digital data sequence pattern recognition and filtering circuit according to claim 1 wherein each combination of binary bits is a multiple of eight-bit bytes.

4. A binary digital data sequence pattern recognition and filtering circuit according to claim 3 wherein the memory device is at least one eight-input erasable memory integrated circuit, having a plurality of addressable memory locations, each memory location having at least as many bits as the number of bytes in the expected sequence.

5. A binary digital data sequence pattern recognition and filtering circuit according to claim 4 wherein the storing and delaying means comprises a plurality of shift registers, each having a number of effective stages at least as large as a number inversely equal to the position of the associated binary "1" bit within the bit combination at the output of the memory device.

6. A binary digital data sequence pattern recognition and filtering circuit according to claim 4 wherein the storing and delaying means comprises a plurality of shift registers, each of which has a number of effective stages represented by a number inversely equal to the position of the associated address bit combination within the expected sequence pattern.

7. A binary digital data sequence pattern recognition and filtering circuit according to claim 6 wherein the sampling means comprises a gating circuit which produces a true output only when all of its input are receiving a binary "1."

8. A binary digital data sequence pattern recognition and filtering circuit for correlating a received pattern of combinations of binary bits with an expected sequence pattern of bit combinations and detecting when the received pattern of bit combinations matches the expected pattern of bit combinations, including at least one digital memory device having address inputs and data outputs, said address inputs being equal in number to the number of bits in said bit combination and said address inputs being connected so as to receive successive applications of the received bit combinations, the contents of each memory location within the digital memory device appearing at the data outputs in response to the address of that memory location appearing at the address inputs, with a binary "1" stored in one of the bit position at each address location, of the digital memory device, the address of which corresponds to one of the bit combinations of the expected pattern of bit combinations, the bit position at which the binary "1" is stored within that address location corresponding to the position of the address bit combination within the expected sequence pattern of bit combinations, characterized by:

each address location of the digital memory device having a capacity of binary bits at least equal to the number of bit combinations contained in the expected pattern of bit combinations;

means for storing and delaying at least one binary "1" bit by at least a number of memory device cycles inversely equal to the position of the associated address bit combination within the expected sequence pattern.

means for sampling the output of the memory device, as delayed, and indicating reception of the expected pattern of bit combination when all binary "1s" are noted.

9. A binary digital data sequence pattern recognition and filtering circuit according to claim 8 wherein the memory device is at least one eight-input erasable memory integrated circuit, having a plurality of addressable memory locations, each memory location having at least as many bit positions as the number of combinations in the expected sequence.

10. A binary digital data sequence pattern recognition and filtering circuit according to claim 9 wherein the storing and delaying means comprises a plurality of shift registers, each having a number of effective stages at least as large as a number inversely equal to the position of the associated combination within the expected sequence pattern.

11. A binary digital data sequence pattern recognition and filtering circuit according to claim 9 wherein the storing and delaying means comprises a plurality of shift registers, each of which has a number of effective stages represented by a number inversely equal to the position of the associated address bit combination within the expected sequence pattern.

* * * * *